Oct. 27, 1970

L. B. JACKSON 3,537,015

DIGITAL PHASE EQUALIZER

Filed March 18, 1968

INVENTOR
L. B. JACKSON
BY
ATTORNEY

United States Patent Office 3,537,015
Patented Oct. 27, 1970

3,537,015
DIGITAL PHASE EQUALIZER

Leland B. Jackson, North Plainfield, N.J., assignor to Bell Telephone Laboratories, Incorporated, Murray Hill and Berkeley Heights, N.J., a corporation of New York
Filed Mar. 18, 1968, Ser. No. 713,621
Int. Cl. H03b 3/04
U.S. Cl. 328—167 5 Claims

ABSTRACT OF THE DISCLOSURE

Allpass digital filters are disclosed in which reordering of summing and multiplying operations has reduced the number of required multiplier circuits. Furthermore, delay circuits in cascade combinations have been shared between sections of the combination to reduce the number of required delay circuits.

BACKGROUND OF THE INVENTION

Field of the invention

This invention relates to the use of allpass digital filters for phase equalization.

Description of the prior art

Phase shift versus frequency characteristics of system components frequently introduce signal distortion. Attempts to compensate for such distortion have been made through the use of allpass filters. Ideally, these filters provide a cômpensating phase shift characteristic while providing a substantially nonvarying attenuation. The extent of compensation of course depends upon limitations encountered in filter design and construction.

In order to provide better compensation, serious consideration has been given to the use of digital filtering. In brief, digital filtering comprises operating on the numerical values of a sampled and encoded input signal to produce numerical values which may be decoded to produce a filtered version of the input signal. Such filtering has a number of advantages over analog filtering. Greater accuracy, for example, may be realized. Furthermore, a greater variety of filters may be constructed, including relatively small and economical units that have good, low frequency characteristics. Still further, such filters use digital circuitry which has several advantages over analog filtering circuitry. Firstly, digital circuitry has a greater tolerance to drifting of component values. Secondly, digital circuitry does not require inductors, which is an advantage when using printed and integrated circuitry.

Prior art digital filters and their theory of operation are described, for example, in: (1) "Some Practical Considerations in the Realization of Linear Digital Filters," by J. F. Kaiser, in the Proceedings of the Third Annual Allerton Conference on Circuit and System Theory (1965); (2) "Digital Filters," by J. F. Kaiser, in System Analysis by Digital Computer, edited by F. F. Kuo and J. F. Kaiser (J. Wiley & Sons, 1966) and; (3) "Digital Filter Design Techniques in the Frequency Domain," by C. M. Rader and B. Gold in the February 1967 Proceedings of the IEEE. Further references are cited in bibliographies included in these references.

A study of the above-cited references discloses that prior art allpass digital filters would use pluralities of multiplier and delay circuits. Although the number of such circuits may not be objectionable when constructing and using only one or two filters, the number does become objectionable when large quantities of cascade allpass digital filters are required, for example, for telephone service. Allpass digital filters employing fewer multiplier and delay circuits are therefore desirable.

SUMMARY OF THE INVENTION

An object of the invention is to reduce the number of multiplier and delay circuits required in allpass digital filters.

This and other objects are achieved by a reconfiguration of allpass filters having a form like that shown in FIG. 1 of the above identified IEEE article. This reconfiguration reduces multiplier circuits by a reordering of multiplying and summing operations. In particular, data in each pair of a number of pairs of encoded data is first summed and then multiplied by a constant instead of multiplying each set of data by a constant and then summing the pairs of products thus produced. This feature of the invention reduces the number of required multiplier circuits to one-half of those previously required.

In accordance with the invention, delay circuits are reduced in number by the sharing of delay circuits by adjacent filter sections of cascade combinations. In particular, applicant has discovered that each set of time delayed data appearing as outputs from the first half of the delay circuits of a filter section are also present—albeit at an earlier time—as outputs from the second half of the delay circuits of its immediately preceding section. Therefore, a feature of the invention is the further connection of the second half of the delay circuits in each filter section as the first half of the delay circuits in the following filter section. As a result of this feature, only $n(s+1)$ delay circuits are required instead of $2n(s)$ circuits, where $n$ is the order of the sections and $s$ is the number of sections.

Other objects and features of the invention will become apparent from a study of the following detailed description of several embodiments.

BRIEF DESCRIPTION OF THE DRAWING

FIG. 1 shows a second order digital filter similar to an allpass second order version of the filter shown in FIG. 1 of the IEEE article. The difference between these filters is that several multiplier circuits have been eliminated by the present invention. This has been accomplished by first summing encoded data that have a common multiplier and then multiplying the sum by a new multiplier. The following discussion enlarges upon this difference.

Figure 1:
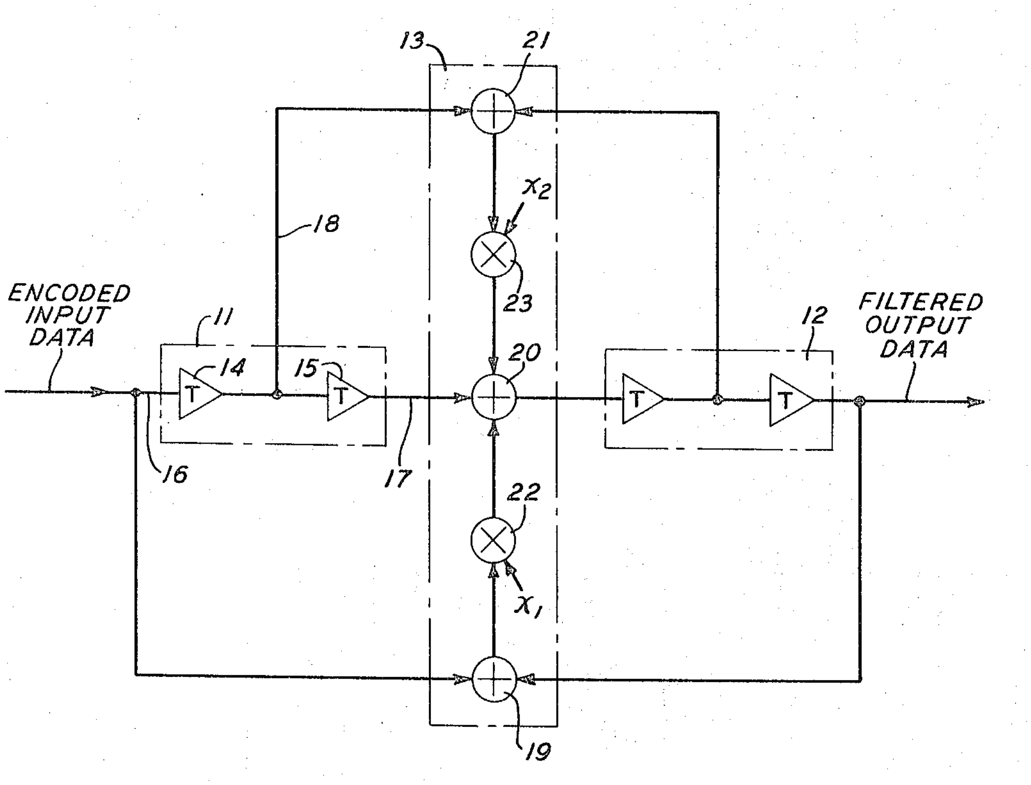
FIG. 1 is a block diagram of a digital filter illustrating one feature of the invention.

The filter of the present FIG. 1 may be viewed from any one of several standpoints. In the following discussion, it is viewed as comprising two similar subsections identified as 11 and 12 and another subsection identified as 13.

Each of subsections 11 and 12 comprises a pair of serially connected delay circuits providing a delay substantially equal to the time period T which is the period of encoded samples. These delay circuits are identified in subsection 11 by the reference characters 14 and 15. Each of subsections 11 and 12 includes an input lead connected to one extremity of the serial combination as, for example, lead 16 connected to the input of delay circuit 14. Each subsection also includes a first output lead connected to the other extremity of the serial combination and a second output lead connected to the junction between the delay circuits, as, for example, leads 17 and 18 of subsection 11.

Subsection 13 comprises three summing circuits 19, 20 and 21, a first multiplier circuit 22 connected from summing circuit 19 to summing circuit 20 and a second multiplier circuit 23 connected from summing circuit 21 to summing circuit 20.

The three subsections are interconnected so that summing circuits 19, 20 and 21 are connected to the input, first output and second output leads of subsection 11, respectively, and, furthermore, to the first output, input and second output leads of subsection 12, respectively.

In accordance with the invention, data appearing on the second output leads of subsections 11 and 12 are summed by summing circuit 21 and then multiplied by a constant $x_2$ by multiplier circuit 23. In a similar manner, data appearing on the input lead of subsection 11 and the first output lead of subsection 12 are summed in summing circuit 19 and then multiplied by a constant $x_1$ by multiplier circuit 22. This results in the use of only one-half of the number of multiplier circuits required for prior art circuits.

Figure 2:
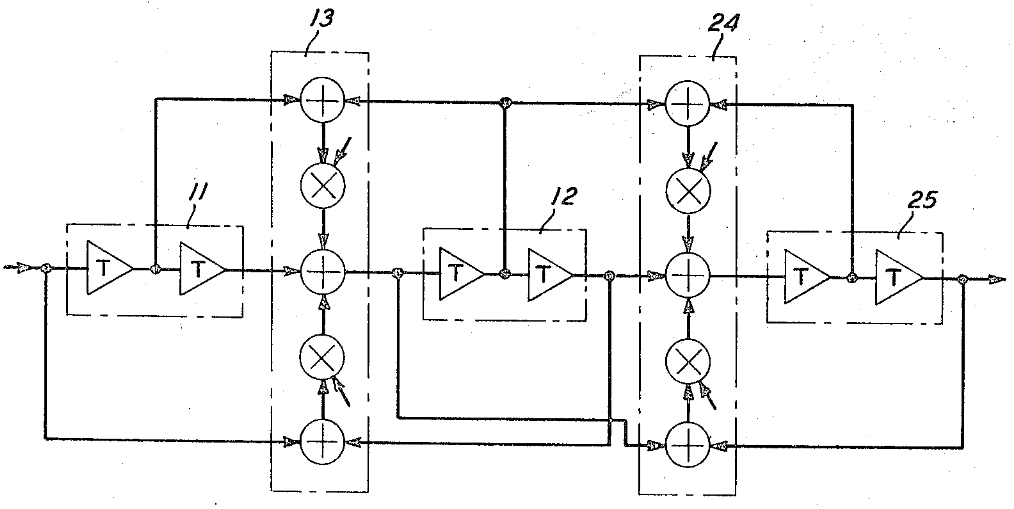
FIG. 2 is another block diagram of a digital filter embodying several features of the invention.

FIG. 2 shows, in block diagram form, a cascade filter embodiment which includes the combination of FIG. 1. This embodiment also includes a subsection 24 which is identical in form to subsection 13 and is connected to subsection 12 in the same manner as subsection 13 is connected to subsection 11. The embodiment further includes a subsection 25 which is identical to subsections 11 and 12 and, furthermore, is connected to subsection 24 in the same manner as subsection 12 is connected to subsection 13. Additional pairs of subsections may, of course, be added to increase the number of sections in the cascade combination. FIG. 2, however, has sufficient subsections to illustrate the reduction in delay circuits achieved by the present invention.

Referring to FIG. 2 in more detail, it will be noted that subsection 12 performs as the last half of the delay circuits of the filter section comprising subsection 13 and, furthermore, as the first half of the delay circuits of the filter section comprising subsection 24. This double usage of subsection 12 reduces the number of required delay circuits. In particular, when $s$ equals the number of sections in the cascaded combination (two in FIG. 2) and $n$ equals the order of the filter sections (also two in FIG. 2), then embodiments of the present invention use $n(s+1)$ delay circuit instead of $2n(s)$ circuits. This results in eliminating $n(s-1)$ delay circuits. Furthermore, the lower the order of the combination, the fever delay circuits required.

The halving of the number of multiplying circuits, as discussed with respect to FIG. 1, is also present in FIG. 2.

While two embodiments have been disclosed and described, it is to be understood that various other embodiments may be devised by those skilled in the art without departing from the spirit and scope of the invention.

What is claimed is:

1. A second order allpass filter that operates on encoded samples of a signal where the encoded samples have a period of T, said filter comprising:

a first subsection comprising a pair of serially connected delay means each providing a delay substantially equal to said period T, an input lead connected to one extremity of said serially connected delay means, a first output lead connected to the other extremity of said serially connected delay means and a second output lead connected to the junction between said serially connected delay means, a second subsection substantially identical to said first subsection, a third subsection comprising first, second and third summing means, a first multiplier connected between the output of said first summing means and an input of said third summing means and a second multiplier connected between the output of said second summing means and an input of said third summing means, and means connecting the first, second and third summing means of said third subsection to the input and second and first output leads, respectively, of said first subsection and, futhermore, to the first and second output and the input leads, respectively of said second subsection.

2. A second order allpass filter that operates on encoded samples of a signal where the encoded samples have a period of T, said filter comprising:

input and output leads, first, second, third and fourth delay means, each of which provides a time delay substantially equal to said period T, first summing means, means serially connecting said first and second delay means, said first summing means and said third and fourth delay means in that order between said input and output leads.

second summing means connected to sum encoded data appearing on said input and output leads, first multiplying means connected to muliply the output of said second summing means by a constant and to apply the product produced thereby to said first summing means, third summing means connected to sum outputs from first and third delay means, and second multiplying means connected to multiply the output of said third summing means by a constant and to apply the product produced thereby to said first summing means.

3. An allpass filter that operates on encoded samples of a signal where the encoded samples have a period of T, said filter comprising:

a plurality of first subsections each of which comprises a pair of serially connected delay means each providing a delay substantially equal to said period T, an input lead connected to one extremity of said serially connected delay means, a first output lead connected to the other extremity of said serially connected delay means and a second output lead connected to the junction between said serially connected delay means, at least one second subsection comprising first, second and third summing means, a first multiplier connected between the output of said first summing means and an input of said third summing means and a second multiplier connected between the output of said second summing means and an input of said third summing means, and means serially interconnecting said first and second subsections in an alternating order with a first subsection occurring first and another first subsection occurring last and the first, second and third summing means of each second subsection connected to the input and second and first output leads, respectively, of the immediately preceding first subsection and the first, second and third summing means of each second subsection connected to the first and second output and the input leads, respectively, of each immediately succeeding first subsection.

4. An allpass filter that operates on encoded samples of a signal where the encoded samples have a period of T, said filter comprising:

input and output leads, a plurality of $s$ first summing means, a plurality of $(2s+2)$ delay means each of which provides a time delay substantially equal to said period T, means connecting all of said delay means and said first summing means in series between said input and output leads with said delay means occurring in pairs and said first summing means occurring between said pairs of delay means, a plurality of $s$ first multiplying means connected to apply their outputs to said first summing means, respectively, a plurality of $s$ second multiplying means connected to apply their outputs to said first summing means, respectively, a plurality of $s$ second summing means connected to apply their outputs to said first multiplying means, respectively, and, furthermore, to sum the input to the delay means preceding and the output of the delay means succeeding the first summing means to which its respective first multipying means is connected, and a plurality of $s$ third summing means connected to apply their outputs to said second multiplying means, respectively, and, furthermore, to sum the input to the second delay means preceding and the output of second delay means succceeding the first summing means to which its respective second multiplying means is connected.

5. In an $n$th order allpass digital filter having a plurality of first combinations each of which multiplies at least two sets of digital data by the same constant and then sums the products produced thereby, a plurality of new combinations to replace said first combinations, respectively, whereby each new combination comprises:

a digital summing circuit to receive said sets of digital data otherwise multiplied by said same constant in said first combination being replaced and to produce a digital output comprising the summation of said received digital data, and a digital multiplying circuit connected to said summing circuit to receive said digital output and to multiply said received digital output by a constant to produce a digital output equal to the product of said received digital output and said constant and, furthermore, equal to the output otherwise produced by said first combination being replaced.

References Cited

UNITED STATES PATENTS

| | | | |
|---|---|---|---|
| 3,307,408 | 3/1967 | Thomas et al. ---- | 328—167 XR |
| 3,314,015 | 4/1967 | Simone ---------- | 328—160 XR |
| 3,370,292 | 2/1968 | Deerfield -------- | 328—167 XR |
| 3,421,141 | 1/1969 | Meyerhoff ------- | 328—167 XR |

STANLEY T. KRAWCZEWICZ, Primary Examiner

U.S. Cl. X.R.

328—160